July 21, 1964 J. W. GIFFEN 3,141,756
GLASS FORMING ELEMENT AND METHOD OF MANUFACTURE
Filed Jan. 16, 1962
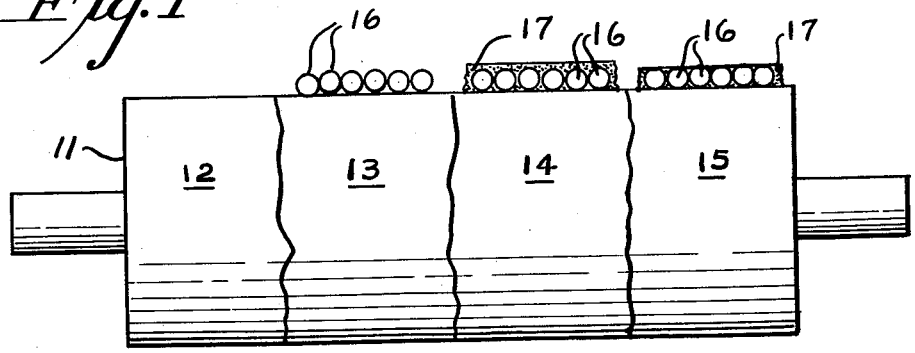
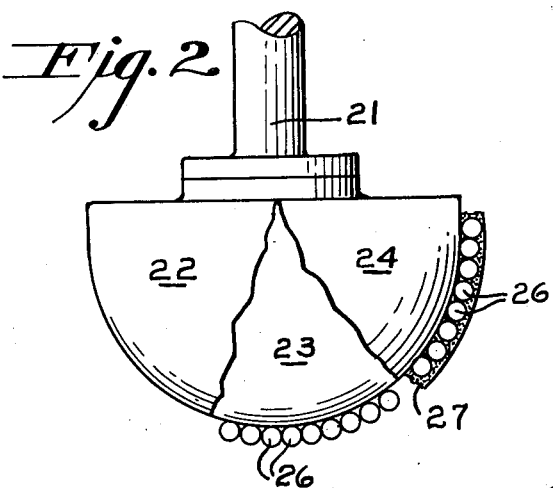
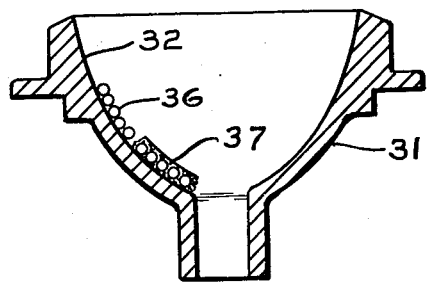
INVENTOR.
JAMES W. GIFFEN
BY
Clarence R. Patty Jr.
ATTORNEY

3,141,756
GLASS FORMING ELEMENT AND METHOD OF MANUFACTURE

James W. Giffen, Corning, N.Y., assignor to Corning Glass Works, Corning, N.Y., a corporation of New York
Filed Jan. 16, 1962, Ser. No. 166,625
4 Claims. (Cl. 65—372)

The present invention relates to glass forming elements, and to the provision of heat barrier coatings to the glass engaging surfaces thereof.

As is well known in the glass industry the working surfaces of glass forming elements, such for example as forming rollers, pressing plungers and molds, must be operated within a limited temperature range to prevent the molten glass sticking thereto. Also under critical requirements such elements, to produce a satisfactory product, must be made of high grade expensive metals or be subjected to expensive plating processes. Moreover, to maintain such elements within their satisfactory operating temperature range has often required elaborate temperature control facilities, since the cyclic high surface temperature of the elements hastens crystallization and deterioration of their surfaces. Additionally there is frequently experienced a gradual build up on the element surfaces of constituents that have been volatilized or "stewed" out of the charges of molten glass and which eventually adversely affect the appearance of articles being formed.

Applicant has discovered that in the thermocycling of glass forming elements, at high temperatures and through wide temperature ranges, they gradually change their form. By way of example the entrance bordering wall of a forming mold for a casserole or the like tends to curl inward toward the mold cavity. When the outer entrance bordering wall of such a mold is an edge over which a trimmer is designed to pass, as for example in an apparatus such as shown in Giffen Patent No. 2,970,405, protection of the mold against dimensional change during use becomes of primary importance.

Attempts have heretofore been made to coat the glass engaging surfaces of glass forming elements of metal to protect them for some of the foregoing reasons or to permit the use of inexpensive mold metals but, so far as applicant is aware, no metal glass working elements have heretofore been provided with a substantially permanent, well adhering inorganic thermal barrier coating that could repeatedly withstand high surface temperatures, suitable for direct contact with molten glass and that would insulate the glass forming surfaces from the relatively high temperature of the molten glass, thus reducing their maximum surface and mean working temperatures materially as well as narrowing their working range to thus overcome the handicaps hereinbefore discussed.

According to the invention a highly refractory coating having excellent heat insulating qualities is applied to a glass forming element by first spraying molten metal on the usual glass contacting surface thereof by means of a conventional metallizing gun in such a fashion that it deposits and welds onto the glass contacting surface of such element a single layer of closely spaced microscopic, usually spherical, metal particles having a mean cross section of between 0.005 and 0.010 inch. Such particles produce a surface having a great multitude of underlying re-entrant interconnected, well defined voids. The surface is then flame sprayed with molten inorganic material such for example as zirconium oxide or aluminum oxide to form a layer thereof which fills such voids and covers the particles.

The thus coated element is then subjected to a polishing treatment. If the element comprises a glass-forming roll the polishing is usually, but not necessarily, continued until the top surfaces of many of the metal particles are exposed so that they can serve to chill the glass and form a desired skin thereon, the thickness of the coating required depending of course on the character of product being drawn and its rate of draw. If the surface is that of a forming plunger or mold, polishing is usually discontinued when a desired smoothness is attained and preferably before exposing the metal particles, to give the mold maximum insulating qualities.

Because of the presence of the metal particles, the oxide coating, whose expansion characteristics are reasonably compatible with an element during its working temperature range, is held tightly interlocked with the element surface and accordingly remains intact through many cycles of use of the element and imparts to the surface of the article engaging it in an entirely satisfactory finish while insulating the element from the high temperature of the molten glass. Moreover, because of the high surface temperature of such coating it permanently remains free of any constituents which volatize out of the glass. Also, because of the high heat insulating qualities of the oxide it protects the molten glass from objectionable chilling at the commencement of forming operations and thus prevents the production of any appreciable amount of unusable ware during the initial phase of an extended period of operation prior to the time that the elements attain their stabilized normal working temperature. Alternatively to coating the element surface with closely spaced microscopic particles of metal, the element surface may be roughened, as by sandblasting and then coated. When the roughening process is employed, for example as applied to a glass forming roller, the roughening treatment is carefully restricted to that which lightly roughens the surface without noticeably reducing the roll diameter, so that the thickness of the coating and its uniformity can be readily measured by remeasurement of the roller diameter.

As an example of the efficaciousness of applicant's glass forming element treatment, untreated and treated casserole molds were concurrently used under conditions in which articles were formed from a ribbon of molten glass at a mean temperature of 1200° C. and wherein the glass remained in the molds for a period of approximately 15 seconds.

Under the foregoing circumstances the untreated mold attained a maximum surface temperature of approximately 650° C., and a mean body temperature of approximately 400° C., and after continuous duty of approximately 10 hours its entrance bordering wall about the periphery of which a trimmer was arranged had become noticeably smaller as evidenced by a substantial clearance developing between such wall and the trimmer. This size change has been attributed to the high temperatures to which the mold surfaces were exposed and the high temperature operating range of the mold. Moreover, because of the rapid chilling of the glass by the mold prior to its reaching a stabilized temperature, approximately the first 50 pieces of ware formed either broke spontaneously before or upon removal from the mold, or had chill wrinkles rendering them worthless.

On the other hand, the treated mold, because of the heat barrier provided by its layer of insulating material, immediately prevented any appreciable chilling of the glass since its own surface substantially instantly acquired a similar temperature and good ware was produced substantially from the beginning of the operation. Moreover, the insulation was effective in preventing the overlaid surface of the mold immediately under the insulation attaining a temperature above approximately 400° C. or 33% of the glass temperature and a mean body temperature approximately 300° C., thus greatly reducing the gradient and mean temperatures of the mold and its working range over those of the untreated mold. Also, because of the relatively low operating temperature of the mold, no dimensional change occurred as evidenced by the fact that no noticeable clearance developed between it and the trimmer. Moreover, no noticeable deterioration of the coating could be detected, thus indicating the usability of less expensive mold materials than would otherwise be required.

The invention will be more thoroughly described in connection with the accompanying drawing which illustrates a number of glass forming elements embodying the invention.

In the drawing,

FIG. 1 is a view, for illustrative purposes, of a sheet glass forming roll showing one portion of its cylindrical surface uncoated, a second portion with spherical bodies, a third portion wherein the spherical bodies have been fully coated, and a fourth coated portion which has its top surface removed to expose the spherical bodies. As will be obvious the coatings have been shown greatly enlarged for illustrative purposes.

FIG. 2 is a view of a glass forming plunger showing its glass engaging surface areas in part uncoated and in part coated in substantially the manner of the showing of FIG. 1.

FIG. 3 is a view, similar to FIG. 2 of forming mold whose glass contacting surface is shown in the manner of showing of FIG. 2.

Referring now to the drawing in detail, in FIG. 1 a typical sheet glass forming roller 11 is illustrated, with the cylindrical surface area 12 shown before treatment. Area 13 has represented thereon the layer of closely spaced metal particles 16 bonded to the roller surface. Area 14 has illustrated thereon the particles after being coated with an oxide 17, and area 15 has represented thereon the finished surface, sufficient of the oxide having been removed to expose the particles 16 to obtain some chilling effect to form a skin on a sheet to be formed between two of such rollers.

In the showing of FIG. 2 the surfaces of the plunger 21 bear reference numerals 22, 23 which correspond to surfaces 12 and 13, and show uncoated particles 26 such as 16 in FIGS. 1 and the particles coated with an oxide 27 as on area 14 of FIG. 1. The coating 27 may or may not show the presence of the particles, depending on the degree if any of chill it is desired to be imparted to glass by the plunger.

In the showing of FIG. 3 the surface area 32, corresponds to area 22 of FIG. 2; the particles 36 to particles 26 and 37 to the oxide coating 27.

What is claimed is:

1. A glass forming element having an improved substantially permanent inorganic thermal barrier coating for repeatably withstanding high surface temperatures produced by molten glass in direct contact therewith which comprises, closely spaced metal particles fusion bonded to the glass contacting surface of said glass forming element with a multitude of re-entrant interconnected voids formed about said metal particles, a heat refractory metal oxide solidified in such voids and about said metal particles to form a continuous protective insulating layer over such particles for engagement with molten glass, and said metal particles tightly interlocking said oxide layer with the surface of said glass forming element.

2. A metal glass forming element having an improved layer of heat refractory insulating material thereon which remains intact through many cycles of use of the element while insulating the element from the high temperatures of molten glass in contact therewith which comprises, a layer of closely spaced metal particles welded to the glass contacting surface of said metal glass forming element with a plurality of interconnected voids formed between such metal particles, a continuous layer of molten glass engaging heat refractory metal oxide insulatably covering said metal particles and extending downwardly into the voids surrounding the metal particles welded to said metal glass forming element adjacent the surface thereof, and said metal particles together with the voids formed thereby tightly interlocking said metal oxide layer to said glass forming element.

3. An improved method of imparting a substantially permanent layer of heat refractory insulating material to the molten glass contacting surface of a glass forming element which comprises, fuse-bonding a plurality of metal particles in closely spaced orientation to such surface so as to form a multitude of re-entrant interconnected voids intermediate such metal particles, applying a molten metal oxide about the metal particles and into such voids to form a continuous layer thereof extending from the surface of the glass forming element to above the metal particles, and solidifying such metal oxide to form a substantially permanent protective heat refractory insulating layer overlying the metal particles.

4. An improved method as defined in claim 3 including the step of polishing the solidified oxide layer to a desired thickness.

References Cited in the file of this patent

UNITED STATES PATENTS

| | | |
|---|---|---|
| 2,567,186 | Cross et al. | Sept. 11, 1951 |
| 2,568,126 | Kelley | Sept. 18, 1951 |
| 2,741,822 | Udy | Apr. 11, 1956 |
| 2,798,577 | La Forge | July 9, 1957 |
| 2,922,255 | Broderick et al. | Jan. 26, 1960 |
| 3,013,892 | Songas | Dec. 19, 1961 |

FOREIGN PATENTS

| | | |
|---|---|---|
| 451,605 | Canada | Oct. 5, 1948 |